(12) United States Patent
Yuuichiroh (10) Patent No.: US 8,982,171 B2
(45) Date of Patent: Mar. 17, 2015

(54) IMAGE FORMING APPARATUS WHICH CORRECTS MAIN SCANNING MISREGISTRATION

(75) Inventor: Shukuya Yuuichiroh, Kunitachi (JP)

(73) Assignee: Ricoh Company, Ltd., Tokyo (JP)

( * ) Notice: Subject to any disclaimer, the term of this patent is extended or adjusted under 35 U.S.C. 154(b) by 866 days.

(21) Appl. No.: 13/083,163

(22) Filed: Apr. 8, 2011

(65) Prior Publication Data
US 2012/0033267 A1 Feb. 9, 2012

Related U.S. Application Data

(63) Continuation of application No. 11/857,505, filed on Sep. 19, 2007, now abandoned.

(30) Foreign Application Priority Data

Sep. 19, 2006 (JP) ................................. 2006-252433

(51) Int. Cl.
*B41J 2/47* (2006.01)
*B41J 2/435* (2006.01)
*B41J 27/00* (2006.01)
*G02B 26/12* (2006.01)
*H04N 1/00* (2006.01)

(52) U.S. Cl.
CPC ............... *G02B 26/123* (2013.01); *B41J 2/473* (2013.01); *H04N 1/00477* (2013.01); *H04N 2201/0072* (2013.01)

USPC ............................ 347/235; 347/250; 347/261

(58) Field of Classification Search
None
See application file for complete search history.

(56) References Cited

U.S. PATENT DOCUMENTS

| 7,573,494 | B2 | 8/2009 | Yoshida |
| 2003/0067533 | A1 | 4/2003 | Omori et al. |
| 2006/0001891 | A1 | 1/2006 | Yoshida |
| 2007/0091165 | A1 | 4/2007 | Shukuya |
| 2007/0122210 | A1 | 5/2007 | Sato et al. |
| 2007/0140721 | A1 | 6/2007 | Shinohara et al. |

FOREIGN PATENT DOCUMENTS

| JP | 07-131616 | 5/1995 |
| JP | 2003-279873 | 10/2003 |

*Primary Examiner* — Uyen Chau N Le
*Assistant Examiner* — John M Bedtelyon
(74) *Attorney, Agent, or Firm* — Oblon, McClelland, Maier & Neustadt, L.L.P.

(57) ABSTRACT

An image forming apparatus includes a light source which illuminates in response to image data, and a deflector to deflect an optical beam output from the light source into a scanning beam running along a main scanning line across an image forming area in a main scanning direction. There are plurality of beam detectors to detect the scanning beam at a plurality of different positions along the main scanning line, the plurality of beam detectors including first and second beam detectors detecting the scanning beam at positions in front-end and rear-end sides, respectively, in the main scanning direction.

8 Claims, 5 Drawing Sheets

IMAGE FORMING APPARATUS WHICH CORRECTS MAIN SCANNING MISREGISTRATION

CROSS-REFERENCES TO RELATED APPLICATIONS

This application is a continuation application of U.S. application Ser. No. 11/857,505, filed Sep. 19, 2007 now abandoned, which claims priority to Japanese Patent Application No. 2006-252433, filed Sep. 19, 2006, the entire contents of which are incorporated herein by reference. This application is related to U.S. patent application Ser. No. 11/586,565 filed Oct. 26, 2006 and entitled "Image forming apparatus capable of effectively correcting main scanning misregistration", which is incorporated herein by reference. The present invention may utilize any feature or technique set forth in application Ser. No. 11/586,565.

BACKGROUND OF THE INVENTION

1. Field of the Invention

The present invention generally relates to an optical apparatus and an image forming apparatus comprises the optical apparatus.

2. Discussion of the Background

A related art image forming apparatus such as a copying machine and a printer, for example, is generally provided with an optical device to produce an optical beam and uses it to write image information on a photoconductor. Such a related art image forming apparatus may employ a plastic lens to provide the optical beam to meet recent trends of reducing costs and weights, for example. In addition, the related art image forming apparatus has increasingly penetrated its market and expanded the range of uses and, as a consequence, it needs to satisfy the market demands for a higher accuracy of an image magnification in a variable magnification operation.

The related art image forming apparatus is generally configured to modulate the optical beam based on image data and to deflect the optical beam in a main scanning direction by a deflection mechanism (e.g., a polygon mirror) so as to make the optical beam scan a photoconductor surface through optical elements including an Fθ lens.

However, each of the related art image forming apparatuses may have a different main scanning magnification due to a variation in the optical device and/or properties of optical elements such as the Fθ lens. A defective operation, for example, a magnification error or a misregistration of a writing start position, may also be generated by a change in a refractive index or a shape of the plastic lens and a change in a scanning position on the photoconductor caused by a variation in an environmental temperature or a variation in a temperature of the apparatus therein. Thereby, an image with a high quality may not be provided. When a related art color image forming apparatus for forming a color image by superimposing a plurality of color images issued, the defective operation, including the magnification error or the misregistration of the writing start position, may be generated in a color basis. Thereby, the main scanning magnification or writing start position for each color may need to be corrected.

JP 2003-279873A proposes to an image forming apparatus that comprises a light source to illuminate in response to image data, a deflector to deflect an optical beam output from the light source into a scanning beam running along a main scanning line across an image forming area in a main scanning direction, first and second beam detectors detecting the scanning beam at positions in front-end and rear-end sides at scanning line in the main scanning direction, a clock generator to generate writing clock signals for controlling an illumination of the light source, a measurement mechanism to measure period during a scanning period between detections of the scanning beam by the first and second beam detectors, a phase corrector to correct a phase of the writing clock signals based on correct amount that is set from measurement result.

JP2003-323085A proposes an image forming apparatus that comprises a plurality of beam detectors detecting the scanning beam at positions at scanning line in the main scanning direction, a clock generator to generate writing clock signals for controlling an illumination of the light source, a measurement mechanism to measure a count number of the writing clock signals generated during a scanning period between detections of the scanning beam by one beam detector and another beam detector by predetermined clock number (two position measurement), a main scanning magnification corrector to correct a main scanning magnification by the measurement mechanism and predetermined clock number.

But if an image forming apparatus uses the above phase correction technique and two position measurements for correcting a main scanning magnification, the image forming apparatus cannot correct a main scanning magnification strictly. This is because phase correction coverage is between front-end synchronous detecting position and rear-end image position. So the image forming apparatus cannot apply phase correction technique to between rear-end image position and rear-end synchronous detecting position, and the image forming apparatus has to use two different frequencies of writing clock signals. And the image forming apparatus counts writing clock signals between front-end synchronous detecting position and rear-end synchronous detecting position for correcting a main scanning magnification. So the frequency of writing clock signal changes while the image forming apparatus counts writing clock signals, the image forming apparatus cannot correct a main scanning magnification strictly.

SUMMARY OF THE INVENTION

The present invention provides an image reading apparatus which can correct a main scanning magnification, and the image forming apparatus controls a frequency of writing clock signals by counting the writing clock signals using a two position measurement technique.

An image forming apparatus according to the invention includes a light source, a deflector such as a rotating polygonal mirror, and front and rear beam detectors. Further, there is a clock generator which generates clock signals to control an illumination of a light source. There is a phase variable control unit which varies a phase of the writing clock signal. A measurement mechanism measures the scanning period between detections by the two beam detectors. A frequency corrector corrects a frequency of the writing clock signal so that a count number measured by the measurement mechanism becomes substantially equivalent to a predetermined referenced count number. A scanning period corrector corrects the scanning period at a scanning area where phase variable control is not available.

The invention also includes a method of correcting a scanning period.

DETAILED DESCRIPTION OF THE INVENTION

In describing exemplary embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, an image forming apparatus according to at least a first exemplary embodiment of the present invention is described.

Figure 1:
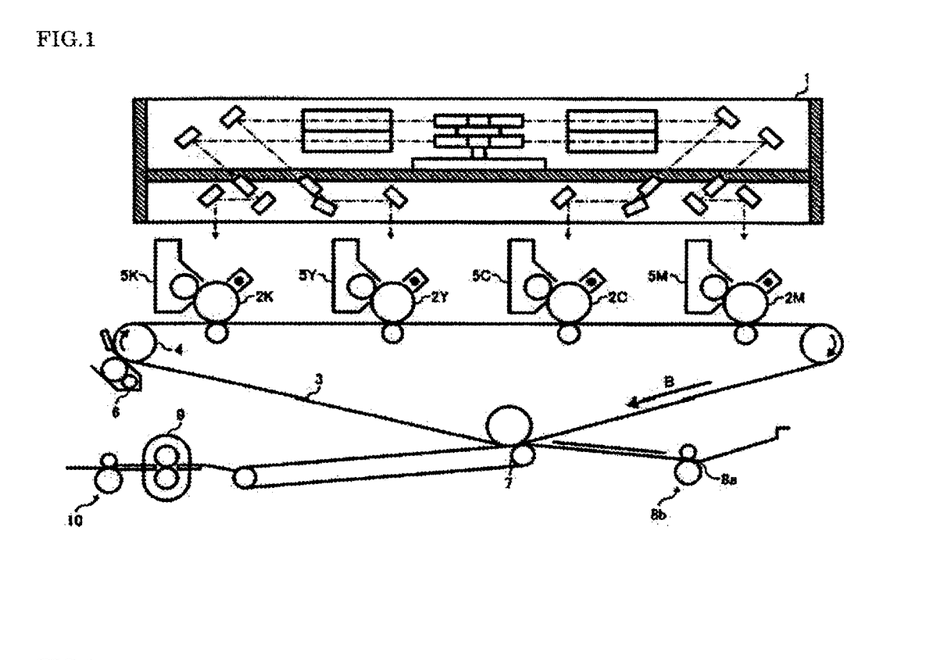
FIG. 1 is a schematic diagram illustrating an image forming apparatus according to an exemplary embodiment of the present invention.

Referring to FIG. 1, the image forming apparatus forming toner images of four colors, black, yellow, cyan, and magenta includes an optical device 1, photoconductor drums 2K, 2Y, 2C, and 2M, an intermediate transfer belt 3, intermediate transfer rollers 4, development devices 5K, 5Y, 5C, and 5M, a belt cleaning device 6, a transfer device 7, a paper-feed registration sensor 8a, a registration roller 8b, a fixing device 9, and an ejection device 10. For a full color image forming apparatus, black, yellow, cyan, and magenta toner colors are respectively indicated using the suffixes K, Y, C, and M, and these color symbols may be omitted, as desired.

The image forming apparatus including the optical device 1 according to at least the first exemplary embodiment of the present invention employs a light source, for example, a laser diode, to irradiate surfaces of the photoconductor drums 2K, 2Y, 2C, and 2M with optical beams so as to form electrostatic latent images. This exemplary embodiment illustrates a full color image forming apparatus which forms a full color image by superimposing toner images of four colors. However, the invention is also applicable to a monochrome image forming apparatus.

The optical device 1 emits the laser beams to expose the surfaces of the photoconductor drums 2K, 2Y, 2C, and 2M. The photoconductor drum 2K, 2Y, 2C, and 2M form electrostatic latent images thereon by the laser beams emitted from the optical device 1. The intermediate transfer belt 3 is an intermediate transfer member on which a toner image is transferred. The intermediate transfer rollers 4 rotate the intermediate transfer belt 3. The development devices 5K, 5Y, 5C, and 5M develop the electrostatic latent images on the photoconductors 2K, 2Y, 2C, and 2M with toners. The belt cleaning device 6 removes remaining toner from the intermediate transfer belt 3. The transfer device 7 transfers the toner image on the intermediate transfer belt 3 onto the transfer sheet. The paper-feed registration sensor 8a detects a leading end of the transfer sheet. The registration roller 8b registers the transfer sheet. The fixing device 9 fixes the toner image on the transfer sheet. The ejection device 10 ejects the transfer sheet on which the toner image is fixed.

The optical device 1 emits the optical beams at controlled timings so as to expose the photoconductors 2 when an image forming operation is requested from an operation unit (not shown) by a user or when a print start signal to start a print job is received from a host computer connected by a network or other type of wired or wireless connection.

Figure 2:
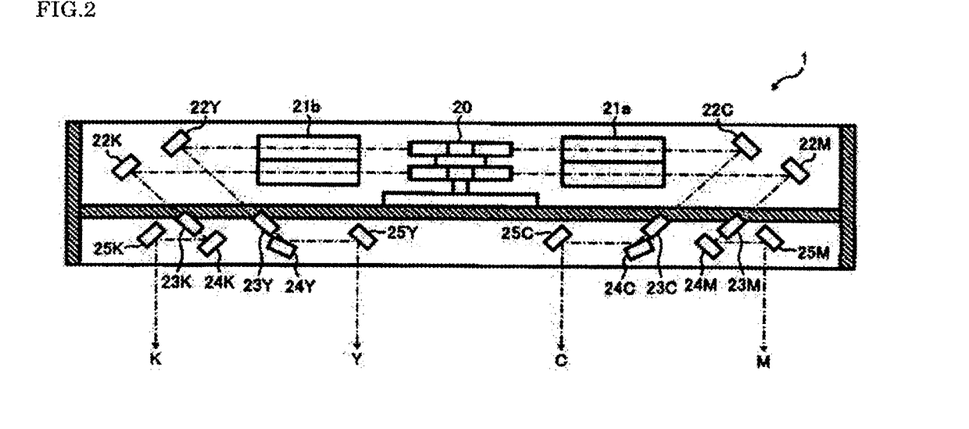
FIG. 2 is a cross sectional view illustrating an optical device included in the image forming apparatus of FIG. 1.
Figure 3:
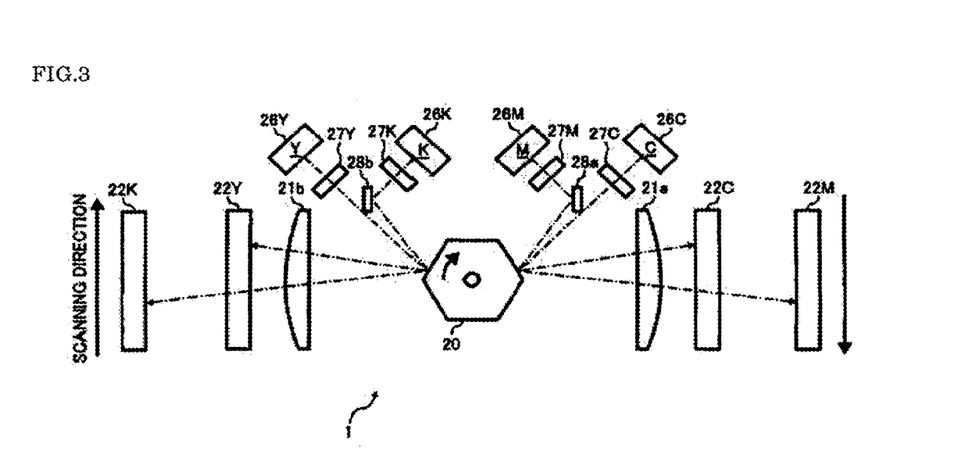
FIG. 3 is a schematic top view illustrating the optical device of FIG. 2.
Figure 4:
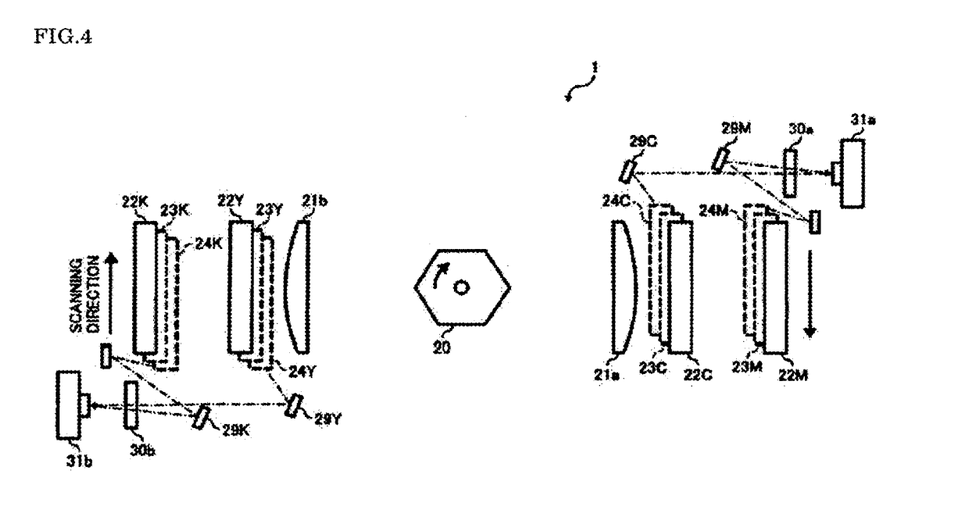
FIG. 4 is another schematic top view illustrating the optical device of FIG. 2.
Figure 5:
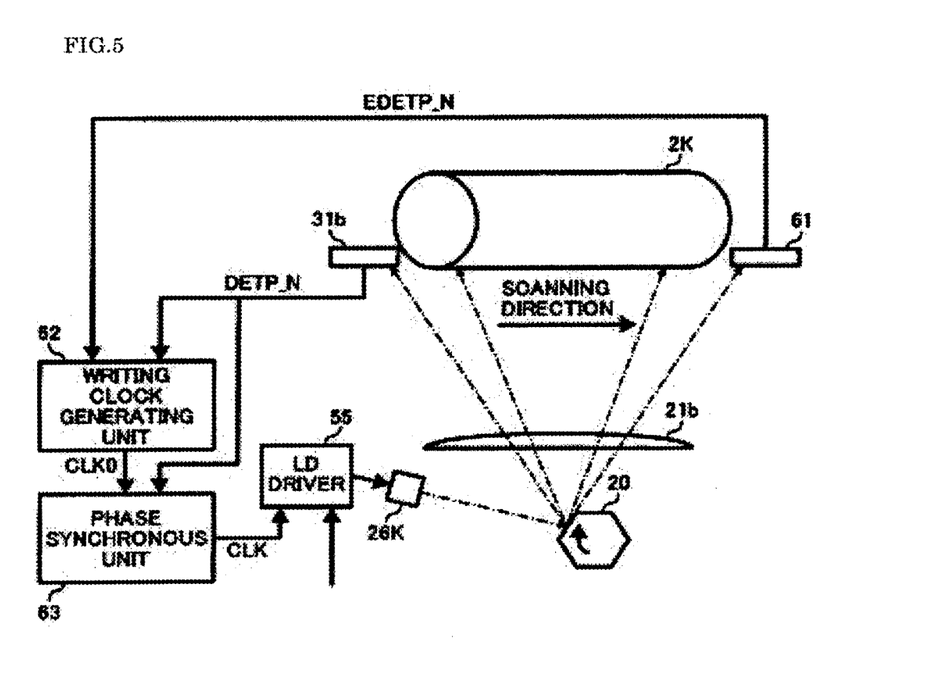
FIG. 5 is a block diagram illustrating a configuration of correcting a main scanning magnification by the optical device of FIG. 2.

A detailed description of the optical device 1 is provided with reference to FIG. 2 though FIG. 5. Each of the development devices 5K, 5Y, 5C, and 5M forms a single color image on each of the respective photoconductor drums 2K, 2Y, 2C, and 2M which is rotated and exposed to the optical beam. When the photoconductor drums 2K, 2Y, 2C, and 2M have respective single color toner images formed thereon, the intermediate transfer belt 3 is rotationally driven by one of three intermediate transfer rollers 4, for example, which is a drive roller. The belt 3 rotates in a direction B shown with an arrow in FIG. 3 around two other intermediate transfer rollers 4 which are driven rollers. The single color images formed on the photoconductor drums 2K, 2Y, 2C, and 2M are sequentially transferred and superimposed onto the intermediate transfer belt 3 so that a full color image is formed on the intermediate transfer belt 3.

When the print start signal is received, a paper-feed unit (not shown) separates one transfer sheet from a plurality of the transfer sheets so as to convey the one transfer sheet to the paper-feed registration sensor 8a. When the one transfer sheet abuts, contacts, or is proximate to the paper-feed registration sensor 8a, conveyance of the transfer sheet is stopped. The registration roller 8b is rotated at a desired timing so that the transfer sheet is fed between the intermediate transfer belt 3 and the transfer device 7. Thereby, the full color image is transferred onto the transfer sheet by the transfer device 7.

The transfer sheet on which the toner image is transferred by the transfer device 7 is conveyed to the fixing device 9 where heat and pressure are applied to fix the transferred image. The transfer sheet is ejected by an ejection roller included in the ejection device 10, and is stacked on an ejection tray (not shown). The image forming apparatus of the exemplary embodiment forms the images of four colors by employing one optical device that is the optical device 1 while a related art optical device included in the related art image forming apparatus has four optical devices to form the images of four colors. A detailed description of the optical device 1 included in the image forming apparatus of FIG. 3 is provided with respect to FIG. 2 through FIG. 5. Referring to FIG. 2, the optical device 1 includes a polygon mirror 20, fθ lenses 21a and 21b, first mirrors 22K, 22Y, 22C, and 22M, curved axis toroidal lenses 23K, 23Y, 23C, and 23M, second mirrors 24K, 24Y, 24C, and 24M, and third mirrors 25K, 25Y, 25C, and 25M. The polygon mirror 20 is disposed in a center of the optical device 1. This polygon mirror 20 deflects the optical beams used for the four colors in a main scanning direction.

Optical elements, for example, the fθ lenses 21a and 21b, the first mirrors 22K, 22Y, 22C, and 22M, the curved axis toroidal lenses 23K, 23Y, 23C, and 23M, the second mirrors 24K, 24Y, 24C, and 24M, and the third mirrors 25K, 25Y, 25C, and 25M, are disposed symmetrically to the central polygon mirror 20. Because of this symmetrical disposition, optical paths for the optical beams of two colors are provided symmetrically so that the polygon mirror 20 deflects the optical beams of the four colors. As shown in FIG. 3, the optical paths for black and yellow are provided at a left side of the polygon mirror 20, and the optical paths for cyan and magenta are provided at a right side of the polygon mirror 20.

An operation of the optical device 1 will be given as follows. Laser diodes mounted in laser units 26K, 26Y, 26C, and 26M (shown in FIG. 2) emit the optical beams towards cylindrical lenses 27K, 27Y, 27C, and 27M (shown in FIG. 2). The cylindrical lenses 27K, 27Y, 27C, and 27M have respective desired refractive indexes in a sub-scanning direction so that the optical beams emitted from the laser units 26K, 26Y, 26C, and 26M are condensed in the sub-scanning direction, and are directed to a mirror side of the polygon mirror 20. The polygon mirror 20 deflects the optical beams in the main scanning direction by high-speed rotations driven by a motor. The fθ lenses 21a and 21b are lenses to correct a scanning velocity of the laser beams. The first mirrors 22K, 22Y, 22C, and 22M reflect the optical beams deflected by the polygon mirror 20.

After the optical beams reflected by the first mirrors 22K, 22Y, 22C, and 22M are directed to the curved axis toroidal lenses 23K, 23Y, 23C, and 23M, the optical beams are directed to the second mirrors 24K, 24Y, 24C, and 24M. The curved axis toroidal lenses 23K, 23Y, 23C, and 23M correct a property of the optical face angle error of the polygon mirror 20. The optical beams reflected by the second mirrors 24K, 24Y, 24C, and 24M are reflected by the third mirrors 25K, 25Y, 25C, and 25M so that the optical beams exit from the optical device 1 in order to form electrostatic images on the respective photoconductors 2K, 2Y, 2C, and 2M. As stated above, the optical elements are disposed symmetrically to the central polygon mirror 20, and the optical paths for the optical beams of two colors are provided symmetrically in the optical device 1 of the exemplary embodiment.

Referring to FIG. 3, a top view of the optical device 1 includes the polygon mirror 20, the fθ lenses 21a and 21b, the first mirrors 22K, 22Y, 22C, and 22M, the laser units 26K, 26Y, 26C, and 26M, the cylindrical lenses 27K, 27Y, 27C, and 27M, and reflection mirrors 28a and 28b.

As stated above, the laser units 26K, 26Y, 26C, and 26M emit the optical beams from the laser diodes (not shown) so that the optical beams are directed towards the cylindrical lenses 27K, 27Y, 27C, and 27M. The cylindrical lenses 27K, 27Y, 27C, and 27M have respective desired refractive indexes in the sub-scanning direction so that the optical beams emitted from the laser units 26K, 26Y, 26C, and 26M are condensed in the sub-scanning direction. The reflection mirrors 28a and 28b may be used to reflect the optical beams so that the optical beams are directed towards the polygon mirror. When the polygon mirror 20 deflects the optical beams in the main scanning direction, the first mirrors 22K, 22Y, 22C, and 22M reflect the optical beams deflected by the polygon mirror 20 through the fθ lenses 21a and 21b.

Referring to FIG. 4, another schematic top view of the optical device 1 is illustrated. The optical beams reflected in certain positions of the main scanning direction by the second mirrors 24K, 24Y, 24C, and 24M (shown in FIG. 4) are reflected by synchronous detection reflection mirrors 29K, 29Y, 29C, and 29M towards synchronous detection lenses 30a and 30b. Thereby, the optical beams are reflected to synchronous detection sensors 31a and 31b. The synchronous detection lenses 30a and 30b condense the optical beams to the synchronous detection sensors 31a and 31b. The synchronous detection sensors 31a and 31b are disposed symmetrically, and detect timings at which the optical beams of two colors are entered. In other words, the synchronous detection sensor 31a detects main scanning reference positions of cyan and magenta while the synchronous detection sensor 31b detects the black and yellow optical beams.

Referring to FIG. 5, a configuration of correcting a main scanning magnification in the optical device is illustrated using the laser unit 26K as an example. As other laser units 26Y, 26C, and 26M are configured to be the same as the laser unit 26K, explanations for these laser units 26Y, 26C, and 26M are omitted.

Figure 7:
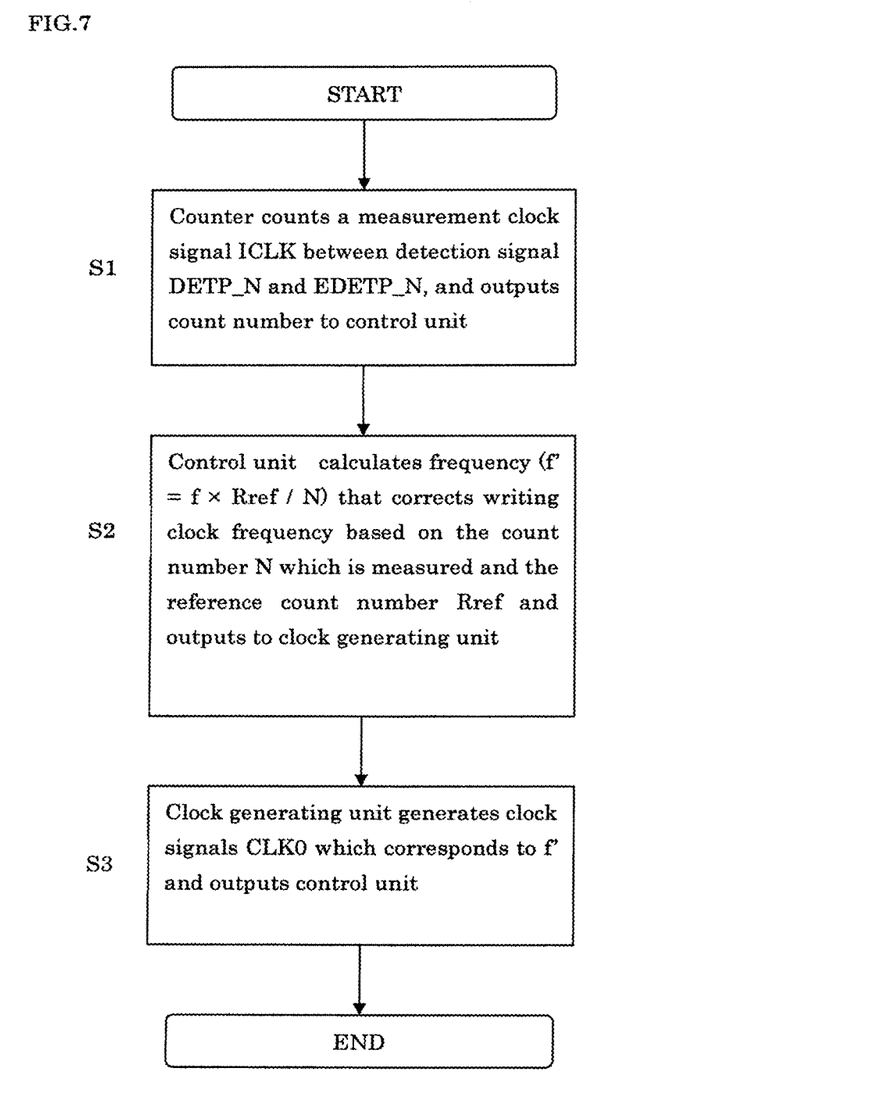
FIG. 7 is a flow chart showing the operation of the invention.

The optical beams emitted from the laser unit 26K are deflected by the rotations of the polygon mirror 20. As shown in FIG. 7, the deflected optical beams are received by the synchronous detection sensor 31b which is disposed outside an image area, expose the photoconductor drum 2Y, and are received by a rear-end synchronous detection sensor 61 which is disposed outside the image area through the fθ lens 21b in a sequential manner.

When the synchronous detection sensor 31b and the rear-end synchronous sensor 61 receive the optical beams, these sensors respectively output to a writing clock generating unit 62. This writing clock generating unit 62 determines or counts a number of clock signals generated between a time the optical beam is received by the synchronous detection sensor 31b and a subsequent time the optical beam is received by the rear-end synchronous detection sensor 61, using the detection signals DETP_N and EDETP_N. The writing clock generating unit 62 stores a reference count number. This reference count number is measured or determined when the main scanning magnification is in an appropriate state. The writing clock generating unit 62 compares the measured count number and the reference count number, and corrects a writing clock frequency such that the measured count number is substantially equal to the reference count number (e.g., within 5%, 3%, 1%, 0.5%, 0.1%, or less, for example). The writing clock generating unit 62 outputs a writing clock signal CLK0 based on the corrected writing clock frequency. The writing clock generating unit 62 outputs a plurality of clock signals as the writing clock signals CLK0, each of which has a different phase. As the writing clock generating unit 62 corrects the main scanning magnification by generating the writing clock signal, the writing clock generating unit 62 may be referred to as a magnification correction unit.

The writing clock signals CLK0 output by the writing clock generating unit 62 are input to a phase synchronous unit 63. The detection signal DETP_N output by the synchronous detection sensor 31b for every scanning of the optical beam is also input to the phase synchronous unit 63.

Among the plurality of writing clock signals CLKO, the phase synchronous unit 63 selects one having a phase closest to a synchronous signal by comparing DETP_N with the writing clock signals CLKO. The clock signal selected by the phase synchronous unit 63 is output to a LD (laser diode) driver 55 as a writing clock signal CLK. The LD driver 55 causes the laser unit 26 to emit based on an image signal (referred to as an image data) and output the optical beam at a desired timing based on a synchronization to the writing clock signal CLK.

Figure 6:
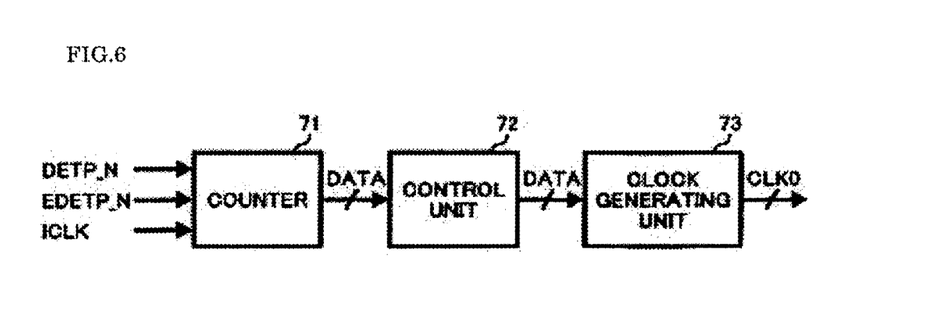
FIG. 6 is a block diagram illustrating a configuration of a writing clock generating unit included in FIG. 5.

Referring to FIG. 6, a configuration of the writing clock generating unit 62 included in FIG. 5 includes a counter 71, a control unit 72, and a clock generating unit 73. The operation of these components is set forth with respect to FIG. 7. Referring to FIG. 7, when the detection signal DETP_N is input, the counter 71 begins to count a measurement clock signal ICLK. A count number of the measurement clock signal ICLK from when the detection signal DETP_N is input until the detection signal EDETP_N is input, is output to the control unit 72 (step 1). The counter 71 is cleared by the detection signal DETP_N. A count number output from the counter 71 represents a scanning period between the synchronous detection sensor 31b and the rear-end synchronous detection sensor 61

It is preferable to use writing clock signal CLK outputted from the phase synchronous unit 63 as a measurement clock signal ICLK. Because a signal that is synchronous with main scanning direction cycle makes the counter 71 reset, there is a reduced risk of miscount due to a phase difference between the synchronous detection sensor 31b and the rear-end synchronous detection sensor 61. Moreover, the use of CLK as ICLK enables accurate counting of the clock signal between the synchronous detection sensor 31b and the rear-end synchronous detection sensor 61 by using the writing signal CLK that is substantially synchronous with synchronous detection signal of main scanning direction.

The control unit 72 calculates the frequency (f'=f×Rref/N) that corrects the writing clock frequency based on the count number N which is measured, etected, or determined, and the reference count number Rref and outputs data to the clock generating unit 73 (step 2). The reference count number Rref is a predetermined number. It is preferable that the count number, which is measured when precorrecting writing clock frequency operation occurs, is used as reference count number Rref, and a measurement clock signal, which is set when correcting writing clock frequency operation occurs, is used. And it is preferable that the reference count number Rref, which is referenced by the writing clock generating unit 62 when the writing clock generating unit 62 controls frequency, is measured when primary correcting writing clock frequency operation occurs. This is because the reference count number Rref enables a reduction in influence of variation in the optical device and/or properties of optical elements and corrects magnification correctly.

The control unit 72 corrects writing clock frequency based on the count number N which is measured and the reference count number Rref. If a writing clock frequency is f, and corrected writing clock frequency is F', the control unit 72 can get corrected writing clock frequency by using below Equation 1.

$$f' = f \times Rref/N \quad \text{Equation 1}$$

The control unit 72 calculates the frequency based on the count number N which is measured between synchronous detection sensors 31b and a rear-end synchronous detection sensor 61 and which is substantially equivalent to a predetermined reference count number Rref.

The clock generating unit 73 generates clock signals CLK0 which corresponds to f' from the control unit 72 and outputs generated clock signals CLK0 to the phase synchronous unit 63 (step 3). Main scanning magnification correction for Yellow, Cyan, and Magenta is the same as what has been described above for Black.

A PLL (phase locked loop) circuit is used for clock generating. But, the frequency generated by a PLL circuit is dispersed, so phase variable control that varies a phase of writing clock signals in units of 1/n of a writing clock cycle, where n is an integer of 2 or greater, at a position or a plurality of positions in the main scanning direction, may be used for slight adjustment of the clock generated by the PLL circuit.

It is preferable that the above slight adjustment amount (phase variable amount) is listed and stored as described below. The slight adjustment amount is determined by the target writing clock frequency.

| | Phase variable amount at area where phase variable control is available |
|---|---|
| f1 | DN1 |
| f2 | DN2 |
| f3 | DN3 |
| f4 | DN4 |
| f5 | DN5 |
| f6 | DN6 |
| f7 | DN7 |
| f8 | DN8 |
| f9 | DN9 |
| F10 | DN10 |
| F11 | DN11 |
| F12 | DN12 |
| F13 | DN13 |
| F14 | DN14 |
| F15 | DN15 |
| F16 | DN16 |
| F17 | DN17 |
| F18 | DN18 |
| F19 | DN19 |
| F20 | DN20 |
| . | . |
| . | . |
| . | . |

* writing clock frequency

Figure 8:
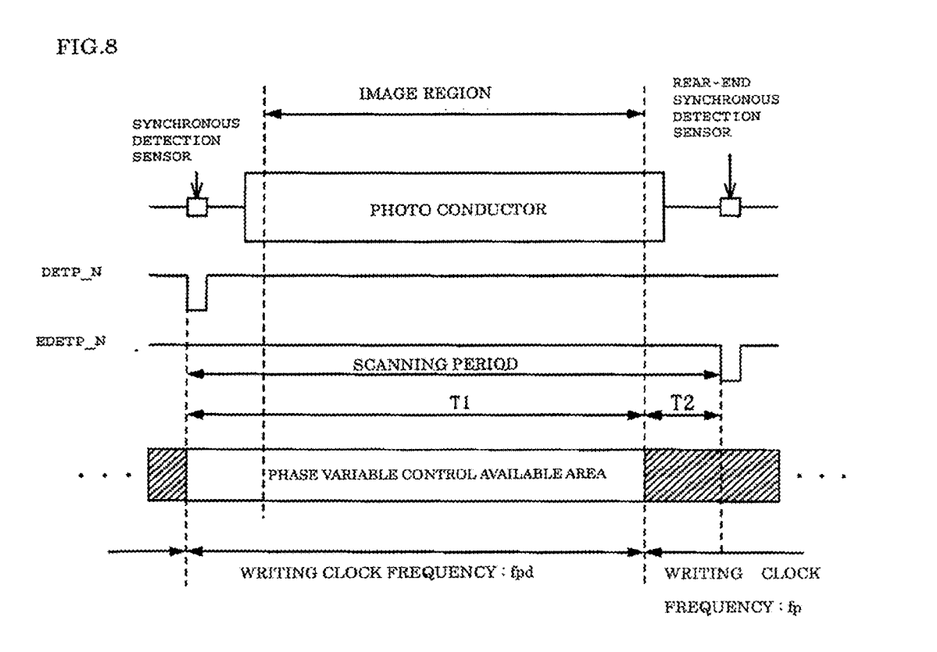
FIG. 8 is a timing diagram showing the operation of the invention.

FIG. 8 shows there is an area where phase variable control is available and there is area where phase variable control is not available. If the image forming apparatus generates the writing clock signal using a PLL circuit and phase variable control, the counter 71 counts a measurement clock signal between detection signals DETP_N outputted by the synchronous detection sensor 31b and detection signals EDE-TP_N outputted by rear-end synchronous detection sensor 61, by writing clock frequency: fpd generated by the PLL circuit and phase variable control at an area where phase correcting technique is available. The counter 71 also counts a measurement clock signal by writing clock frequency: fp generated by PLL at area where phase variable control is not available. The counter 71 counts a measurement clock signal using a different clock frequency at an area where phase variable control is available and an area where phase variable control is not available, so the image forming apparatus may not be able to completely correct the main scanning magnification.

The invention includes an image forming apparatus as described in the below three embodiments which can properly correct the main scanning magnification.

Embodiment 1

The control unit 72 stores a list or table as set forth below. The table has a phase variable amount DN' at an area where phase variable control is not available. The phase variable amount DN' is a predetermined ideal amount.

| Writing clock signal frequency | Phase variable amount at area where phase variable control is available | Phase variable amount at area where phase variable control is not available |
|---|---|---|
| f1 | DN1 | DN'1 |
| f2 | DN2 | DN'2 |
| f3 | DN3 | DN'3 |
| f4 | DN4 | DN'4 |
| f5 | DN5 | DN'5 |
| f6 | DN6 | DN'6 |
| f7 | DN7 | DN'7 |
| f8 | DN8 | DN'8 |
| f9 | DN9 | DN'9 |

-continued

| Writing clock signal frequency | Phase variable amount at area where phase variable control is available | Phase variable amount at area where phase variable control is not available |
|---|---|---|
| f10 | DN10 | DN'10 |
| f11 | DN11 | DN'11 |
| f12 | DN12 | DN'12 |
| f13 | DN13 | DN'13 |
| f14 | DN14 | DN'14 |
| f15 | DN15 | DN'15 |
| f16 | DN16 | DN'16 |
| f17 | DN17 | DN'17 |
| f18 | DN18 | DN'18 |
| f19 | DN19 | DN'19 |
| f20 | DN20 | DN'20 |
| . | . | . |
| . | . | . |
| . | . | . |

The control unit 72 references the table to read the phase variable amount DN' in accordance with the count number N and writing clock frequency fn that is measured as described above. The control unit 72 corrects the count number N based on phase variable amount DN'. If the corrected count number is N', the coefficient for converting the phase variable amount DNn' into count number is α, the control unit 72 can get the corrected count number N' using Equation 2.

$$N' = N + \alpha \times DNn' \qquad \text{Equation 2}$$

The control unit 72 can determine the corrected writing clock frequency using equation 1 and by using N'. Thus, the image forming apparatus can correct the main scanning magnification correctly. Because the control unit 72 can get the count number that is substantially the same count number that is measured by almost the same frequency between the detection signals DETP_N outputted by the synchronous detection sensor 31*b* and the detection signals EDETP_N the outputted by the rear-end synchronous detection sensor 61.

For example, if N is 20000[1/16 dot], DNn' is 10[1/4 dot], α is 4, fn is 50.0 [MHz], Rref is 20200[1/16 dot], the control unit 72 can get corrected writing clock frequency f using Equation 3.

$$\begin{aligned} f' &= fn \times Rref / N \qquad \text{Equation 3} \\ &= f \times Rref / (N + \alpha \times DNn') \\ &= 50.0 \times 20200 / (20000 + 4 \times 10) \\ &= 50.3992 \; [\text{MHz}] \end{aligned}$$

In this embodiment, the control unit 72 has a phase variable amount DN'. The control unit 72 can store values considered α instead of the phase variable amount DN'.

Embodiment 2

The control unit 72 calculates phase variable amount DN' in accordance with the area where phase variable control is not available using DNn that is a phase variable amount at an area where phase variable control is available. If T1 is a scanning period at an area where phase variable control is available, and T2 is a scanning period at an area where a phase variable control is not available, the control unit 72 can calculate the phase variable amount DN' using Equation 4.

$$DNn' = DNn \times T2/T1 \qquad \text{Equation 4}$$

The control unit 72 corrects the count number N by adding a result of DNn×T2/T1, if the writing clock frequency is fn and the coefficient for converting the phase variable amount DNn' into count number is α.

The control unit 72 can get the corrected count number N' using Equation 5.

$$N' = N + \alpha \times DNn \times T2/T1 \qquad \text{Equation 5}$$

The control unit 72 can get the corrected writing clock frequency using the above equation 1 by using N'. So, the image forming apparatus can correct the main scanning magnification correctly. Because the control unit 72 can get the count number that is substantially the same count number that is measured by almost same frequency between detection signals DETP_N outputted by the synchronous detection sensor 31*b* and detection signals EDETP_N outputted by rear-end synchronous detection sensor 61.

For example, if N is 20000[1/16 dot], DNn is 200[1/4 dot], α is 4, fn is 50.0 [MHz], Rref is 20200[1/16 dot], T1 is 300 [µs], T2 is 30 [µs], the control unit 72 can get the corrected writing clock frequency f using Equation 6.

$$\begin{aligned} f' &= fn \times Rref / N \qquad \text{Equation 6} \\ &= f \times Rref / (N + \alpha \times DNn \times T2/T1) \\ &= 50.0 \times 20200 / (20000 + 4 \times 200 \times 30/300) \\ &= 50.2988 \; [\text{MHz}] \end{aligned}$$

Embodiment 3

The control unit 72 can correct the count number N by using fpd generated by the PLL circuit and phase variable control at an area where the phase correcting technique is available, and fp generated by PLL at an area where the phase variable control is not available.

The control unit 72 can get the corrected count number N' using Equation 7.

$$N' = N + T2 \times (fpd - fp) \qquad \text{Equation 7}$$

The control unit 72 can get the corrected writing clock frequency using the above equation 1 by using N'. So, the image forming apparatus can correct main scanning magnification correctly. The control unit 72 can get the count number that is substantially the same count number that is measured by almost the same frequency between detection signals DETP_N outputted by the synchronous detection sensor 31*b* and detection signals EDETP_N outputted by the rear-end synchronous detection sensor 61.

For example, if N is 20000[1/16 dot], DNn is 200[1/4 dot], β is 16, Rref is 20200[1/16 dot], T2 is 30 [µs], fdp is 50.0 [MHz], fp is 49.0 [MHz], the control unit 72 can get the corrected writing clock frequency f using Equation 8.

$$\begin{aligned} f' &= fpd \times Rref / N \qquad \text{Equation 8} \\ &= f \times Rref / (N + \beta \times T2 \times (fpd - fp)) \\ &= 50.0 \times 20200 / \\ &= (20000 + 16 \times 30 \times 10^{-6} \times (50.0 - 49.9) \times 10^6) \\ &= 50.2988 \; [\text{MHz}] \end{aligned}$$

The main scanning magnification correction for Yellow, Cyan, and Magenta is the same as the above mentioned main scanning magnification correction for Black.

This invention is applicable to mono-color image forming apparatuses, and also plural color image forming apparatuses.

Obviously, numerous additional modifications and variations of the present invention are possible in light of the above teachings. It is therefore to be understood that within the scope of the appended claims, the present invention may be practiced otherwise than as specifically described herein.

What is claimed is:

1. An image forming apparatus, comprising:
a light source configured to illuminate in response to image data;
a deflector configured to deflect an optical beam output from the light source into a scanning beam running along a main scanning line across an image forming area in a main scanning direction;
a plurality of beam detectors to detect the scanning beam at a plurality of corresponding positions along the main scanning line, the plurality of beam detectors including first and second beam detectors detecting the scanning beam at positions in front-end and rear-end sides, respectively, in the main scanning direction;
a clock generator to generate writing clock signals that control illumination of the light source;
a phase variable control unit configured to vary a phase of the writing clock signals generated by the clock generator, in units of 1/n of a writing clock cycle, where n is an integer having a value of 2 or greater;
a measurement mechanism to measure a first count number of the writing clock signals at a first frequency between detections of the scanning beam by the first and second beam detectors and a second count number of the writing clock signals at a second frequency different form the first frequency in an area where phase control is not available;
a frequency corrector to correct a frequency of the writing clock signals so the count number measured by the measurement mechanism becomes substantially equivalent to a predetermined reference count number; and
a scanning period corrector to correct a scanning period at a scanning area where phase variable control is not available based on the first count number and the second count number.

2. The image forming apparatus is as claimed in claim 1, wherein the scanning period corrector stores phase variable amount data for the scanning area where phase variable control is not available and corrects the scanning period based on the phase variable amount data at the scanning area where phase variable control is not available.

3. The image forming apparatus is as claimed in claim 1, wherein the scanning period corrector is configured to calculate a phase variable amount at the scanning area where phase variable control is not available based on a phase variable amount at the scanning area where phase variable control is available, and is configured to correct scanning period based on the calculated phase variable amount at the scanning area where phase variable control is not available.

4. The image forming apparatus is as claimed in claim 1, wherein the scanning period corrector is configured to correct the scanning period based on a frequency at an area where phase variable control is available and based on a frequency at an area where phase variable control is not available.

5. A method of controlling an image forming process, comprising:
illuminating, via a light source, in response to image data;
deflecting, via a deflector, an optical beam output from the light source into a scanning beam running along a main scanning line across an image forming area in a main scanning direction;
detecting, via a plurality of beam detectors, the scanning beam at a plurality of corresponding positions along the main scanning line, the plurality of beam detectors including first and second beam detectors detecting the scanning beam at positions in front-end and rear-end sides, respectively, in the main scanning direction;
generating, via a clock generator, writing clock signals that control illumination of the light source;
varying, via a phase variable control unit, a phase of the writing clock signals generated by the clock generator, in units of 1/n of a writing clock cycle, where n is an integer having a value of 2 or greater;
measuring, via a measurement mechanism, a first count number of the writing clock signals at a first frequency between detections of the scanning beam by the first and second beam detectors and a second count number of the writing clock signals at a second frequency different form the first frequency in an area where phase control is not available;
correcting, via a frequency corrector, a frequency of the writing clock signals so the count number measured by the measurement mechanism becomes substantially equivalent to a predetermined reference count number; and
correcting, via a scanning period corrector, a scanning period at a scanning area where phase variable control is not available based on the first count number and the second count number.

6. A method according to claim 5, wherein the correcting of the scanning period includes storing phase variable amount data for the scanning area where phase control is not available, and correcting the scanning period based on the phase variable amount data at the scanning area where phase variable control is not available.

7. A method according to claim 5, wherein the correcting of the scanning period includes calculating a phase variable amount at the scanning area where phase variable control is not available based on a phase variable amount at the scanning area where phase variable control is available, and correcting the scanning period based on the calculated phase variable amount at the scanning area where phase variable control is not available.

8. A method according to claim 5, wherein the correcting of the scanning period includes correcting the scanning period based on a frequency at an area where phase control is available and based on a frequency at an area where phase control is not available.

* * * * *

UNITED STATES PATENT AND TRADEMARK OFFICE
CERTIFICATE OF CORRECTION

| | |
|---|---|
| PATENT NO. | : 8,982,171 B2 |
| APPLICATION NO. | : 13/083163 |
| DATED | : March 17, 2015 |
| INVENTOR(S) | : Yuichiro Shukuya |

It is certified that error appears in the above-identified patent and that said Letters Patent is hereby corrected as shown below:

On the title page, Item (12), the Letters Patent Heading, and Item (75), the Inventor's name is incorrect. Items (12) and (75) should read:

-- (12) United States Patent
      Shukuya --

-- (75) Inventor: Yuichiro SHUKUYA, Kunitachi-shi (JP) --

Signed and Sealed this
Eighth Day of September, 2015

Michelle K. Lee
*Director of the United States Patent and Trademark Office*